United States Patent [19]
Daniels et al.

[11] 3,816,265

[45] June 11, 1974

[54] DISTILLATION OF READILY POLYMERIZABLE ETHYLENICALLY UNSATURATED AROMATIC HYDROCARBON COMPOUNDS WITH N-NITROSODIPHENYLAMINE

[75] Inventors: Calvin L. Daniels; Robert Boadle, both of Big Spring, Tex.

[73] Assignee: Cosden Oil & Chemical Company, Big Springs, Tex.

[22] Filed: Oct. 13, 1971

[21] Appl. No.: 189,046

[52] U.S. Cl............................ 203/9, 203/59, 203/69, 260/666.5, 260/669 A, 260/674 R
[51] Int. Cl......... B01d 3/34, C07c 7/04, C07c 7/18
[58] Field of Search ....................... 203/8, 9, 59, 69; 260/666.5, 669 A, 674 R

[56] References Cited

UNITED STATES PATENTS

| | | | |
|---|---|---|---|
| 2,527,916 | 10/1950 | Churchill .............................. | 203/9 |
| 3,015,677 | 1/1962 | Vogt et al. ............................. | 203/8 |
| 3,275,531 | 9/1966 | Sennewald et al...................... | 203/8 |
| 3,515,647 | 6/1970 | Van Tassell et al. .................. | 203/9 |
| 3,523,141 | 8/1970 | Sakashita .............................. | 203/9 |
| 3,527,822 | 8/1970 | Benson ................................. | 203/9 |

*Primary Examiner*—Wilbur L. Bascomb, Jr.

[57] ABSTRACT

The present invention relates to a process for the distillation of readily polymerizable ethylenically unsaturated compounds comprising subjecting such compounds to distillation conditions in the presence of N-nitroso diphenyl amine as a polymerization inhibitor in the absence of oxygen (air) and sulfur.

7 Claims, No Drawings

DISTILLATION OF READILY POLYMERIZABLE ETHYLENICALLY UNSATURATED AROMATIC HYDROCARBON COMPOUNDS WITH N-NITROSODIPHENYLAMINE

BACKGROUND OF THE INVENTION

The present invention relates to a process for the distillation or readily polymerizable, ethylenically unsaturated compounds. More particularly, the present invention relates to a process of distillation whereby the amount of polymerization of a readily polymerizable, ethylenically unsaturated compound is substantially reduced during distillation as compared to present methods. Still more particularly, the present invention relates to a process of distillation whereby the material accumulating in the bottom or reboiler area of the distillation apparatus can be reused as opposed to certain present methods wherein such bottom or reboiler area material is a high pollution waste material. Additionally, the present invention relates to a process of distillation whereby the rate of throughput for a given distillation apparatus can be increased over the rate at which such distillation apparatus can be operated using present methods.

It is known that ethylenically unsaturated compounds such as monomeric styrene and divinylbenzene polymerize readily and that the rate of polymerization increases with increasing temperature. Inasmuch as divinylbenzene and styrene produced by common industrial methods contain impurities, they must be subjected to separation and purification to be suitable for certain further desirable industrial uses. Such separation and purification generally is accomplished by distillation. To prevent polymerization during distillation various prior art processes employing known polymerization inhibitors such as 4-tert-butylcatechol (TBC) and hydroquinone have been employed. However, vacuum distillation is the preferred method for the separation of unstable organic liquid mixtures and the aforementioned prior art inhibitors are effective only in the presence of oxygen. The partial pressure of oxygen in a vacuum distillation column is too low for such conventional inhibitors to be effective. Another prior art method involves the use of sulfur as the polymerization inhibitor. Although sulfur is effective in the absence of oxygen, it is not as effective as the inhibitor of the present invention and, as an additional undesirable feature, forms a high pollution valueless waste material in the reboiler bottoms.

An example of prior art methods is found in the distillation of vinyl aromatic compounds such as divinylbenzene. In such prior art method, the mixture to be distilled generally is first contacted with the chemical polymerization inhibitor, i.e., sulfur and/or TBC. The resulting mixture containing the chemical polymerization inhibitors is then subjected to distillation conditions in the distillation apparatus. The amount of polymer formed in the distillation apparatus and in the high purity product taken therefrom is substantially higher than desired, and occasionally complete polymerization occurs inside the distillation apparatus. For instance, in the process of distilling crude divinylbenzene (a mixture containing divinylbenzenes, diethylbenzenes and monovinylbenzene) to obtain high purity divinylbenzenes, even when inhibited with sulfur and TBC a divinylbenzene product is obtained which contains significant quantities of polymer which are difficult to separate from the divinylbenzene and detrimental to the use of such divinylbenzenes. Furthermore, the material which is removed from the bottom or reboiler area of the distillation apparatus is a high pollution sulfurous waste material which must be disposed of.

Other prior art methods utilize certain specific nitroso compounds as a vacuum distillation polymerization inhibitor. An example of such prior art method is found in the distillation of styrene monomer. In such prior art method, a nitroso compound polymerization inhibitor such as N-nitroso phenylhydroxylamine or p-nitroso-N,N-dimethylaniline is admixed with or dissolved in the monomer to be distilled. Although such inhibitors are effective in the absence of oxygen, they are not as effective in preventing polymerization as may be desired or are not soluble in stryene.

It is now an object of the present invention to provide a new and improved process for the distillation of readily polymerizable ethylenically unsaturated compounds.

Another object of the present invention is to provide a new and improved process for the distillation of readily polymerizable ethylenically unsaturated compounds, which process results in higher recovery of the high purity unsaturated compound and produces less undesirable by-products.

A further object of the present invention is to provide a new and improved process for the distillation of readily polymerizable ethylenically unsaturated compounds, which process results in the production of substantially less polymerized material in the distillation apparatus.

A still further object of the present invention is to provide a new and improved process for the distillation of readily polymerizable ethylenically unsaturated compounds, which process does not produce high pollution bottom or reboiler area waste material.

A yet still further object of the present invention is to provide a new and improved process for the distillation of readily polymerizable ethylenically unsaturated compounds, which process enables a given distillation apparatus to be operated at an increased rate of throughput without a reduction in efficiency.

Additional objects will become apparent from the following description of the invention herein disclosed.

SUMMARY OF THE INVENTION

The present invention, which fulfills these and other objects, in one of its embodiments is a process for the distillation of readily polymerizable ethylenically unsaturated compounds, said process comprising subjecting such readily polymerizable ethylenically unsaturated compound to distillation conditions in the presence of N-nitroso-diphenyl amine (NDPA) and in the absence of oxygen (air) and sulfur. In another embodiment, the present invention comprises solubalizing the NDPA in a heavy hydrocarbon fraction having a higher boiling point than the readily polymerizable ethylenically unsaturated compound to be distilled, mixing the solution of NDPA and heavy hydrocarbon fraction with the readily polymerizable ethylenically unsaturated compound to be distilled, and distilling the resultant mixture in a distillation apparatus in the absence of oxygen and sulfur.

Through the use of the process of the present invention, the amount of polymerization occurring inside the distillation apparatus as compared to prior art methods is significantly reduced. In addition, the amount of desired distillation product is increased in proportion to the decrease in the amount of polymer formation. Also, the rate of operation of a given distillation apparatus can be increased over the rate of operation of such apparatus utilizing certain present methods. Still further, the material accumulating in the bottom or reboiler area of the distillation apparatus can be reused, e.g., for its fuel value or for reprocessing, as opposed to certain present methods utilizing sulfur as a polymerization inhibitor wherein such bottom or reboiler area material is a high pollution waste material.

DESCRIPTION OF THE PREFERRED EMBODIMENTS OF THE PRESENT INVENTION

The distillation process of the present invention employs N-nitroso diphenyl amine (NDPA) in the absence of oxygen (air) and sulfur to inhibit polymerization of the readily polymerizable ethylenically unsaturated compound being distilled.

The distillation technique of the process of the present invention is suitable for use in virtually any type of separation of a readily polymerizable ethylenically unsaturated compound from a mixture where such readily polymerizable unsaturated compound is subjected to temperatures above room temperature. The process of the present invention is especially useful in vacuum distillation, the preferred method for separation of unstable organic liquid mixtures. A particularly useful application of the process of the present invention is in the distillation of aromatic hydrocarbons having ethylenically unsaturated substituents. In its most useful application, the distillation technique of the present invention is applied to the distillation of mixtures containing ethylenically unsaturated compounds such as styrene, alpha methyl styrene, vinyl toluene, vinyl naphthalene and divinylbenzenes and the like. The preferred application of the present invention is in the distillation of crude divinylbenzene or crude styrene in the absence of oxygen (air) and sulfur.

The amount of polymerization inhibitor added can vary widely. Generally, the degree of stabilization is proportional to the amount of inhibitor added. Inhibitor concentrations between about 50 ppm and 2,000 ppm have generally proven suitable, depending on the temperature of the distillation mixture and the degree of inhibition desired.

During vacuum distillation of divinylbenzene-containing mixtures and styrene-containing mixtures, the temperature of the reboiler is preferably maintained at from about 150°F to about 260°F by controlling reboiler pressure at from about 30 mm. to about 400 mm. of Hg. Under such conditions, in a distillation apparatus having a distillation zone containing from about 50 to about 100 distillation stages, inhibitor concentrations from about 50 ppm to about 2,000 ppm are suitable with concentrations of from about 100 ppm to about 500 ppm being preferred for styrene distillation and 500 ppm to 2,000 ppm being preferred for divinylbenzene distillation.

The NDPA may be introduced into the distillation apparatus in any convenient manner which permits efficient distribution of such substance throughout the distillation apparatus. The manner of introduction is not critical so long as it is intimately distributed within the distillation mixture. It is somewhat preferred, however, that the NDPA be added to the distillation mixture prior to entry into the distillation apparatus. In one embodiment of the present invention, the NDPA, prior to being introduced into the distillation mixture, is dissolved in a heavy hydrocarbon fraction having a higher boiling point than the ethylenically unsaturated compound which is to be distilled. The ratio of NDPA to the heavy hydrocarbon fraction can vary widely. Inhibitor to heavy hydrocarbon ratios between about 1 to 1 and 1 to 200 have generally proven suitable, depending on the rate of throughput at which the distillation apparatus is operated. The boiling point of the heavy hydrocarbon fraction should be at least about 20°F higher than the boiling point of the ethylenically unsaturated compound which is to be distilled.

Suitable heavy hydrocarbon fractions include paraffinic, naphthenic and aromatic hydrocarbons. In particular, suitable aromatic hydrocarbons are those having greater than two substituents to the aromatic nucleus, including polyalkylbenzenes having greater than ten carbon atoms, i.e., polyethylbenzenes such as triethylbenzene, tetraethylbenzene, pentaethylbenzene, hexaethylbenzene and the like, tetramethylbenzene, methylnaphthalene and the like. The preferred aromatic hydrocarbons are polyethylbenzenes such as triethylbenzene, tetraethylbenzene and the like. Other suitable heavy hydrocarbon fractions include cycle oils, gas oils and the like.

After being so dissolved, the heavy hydrocarbon fraction containing the dissolved NDPA is introduced into the distillation mixture. There are several advantages to this embodiment. The pre-dissolving technique enables more efficient mixing of the NDPA with a continuous feed stream of the distillation mixture entering the distillation apparatus. Additionally, the higher boiling heavy hydrocarbon fraction accumulates in the reboiler area of the distillation apparatus and forms a liquid bottoms material having a higher heat content than would liquid bottoms consisting substantially of only the lower boiling ethylenically unsaturated compound being distilled. The higher heat content of the heavy hydrocarbon fraction bottoms enables a shorter residence time in the high heat bottoms area for the readily polymerizable unsaturated compound being distilled and a consequent reduction in the amount of polymerization occurring in the bottom area. Still further, the shorter residence time enables the distillation apparatus to be operated at a higher distillation mixture throughput.

Another factor enabling the distillation apparatus to operate at an increased rate utilizing the process of the present invention as opposed to prior art processes is the fact that NDPA is a more efficient polymerization inhibitor at a given temperature than the prior art inhibitors and will allow higher distillation temperatures and higher pressures, thus increasing the rate of distillation without increasing the amount of polymerization over that which would occur in the distillation apparatus at lower temperatures using other polymerization inhibitors.

When the process of the present invention is utilized, the bottoms material which accumulates during the distillation process can be drawn off and utilized for its heating value or for reprocessing. When utilizing the commonly used prior art method for vacuum distillation of readily polymerizable ethylenically unsaturated compounds employing sulfur as the polymerization inhibitor, or sulfur in combination with other chemical polymerization inhibitors, a bottoms material is formed which is valueless for further use and constitutes a high pollution waste material which must be disposed of.

Upon recovery of the distillation product obtained in accordance with the present invention, it is found that a higher percentage of the pure readily polymerizable unsaturated compound is recovered in an unpolymerized state. Particularly, when employing the present invention in its preferred application to separate readily polymerizable unsaturated divinylbenzene compounds or styrene compounds, it is found that substantially less polymerized material is contained in the distillation apparatus and in the distillation product.

In order to more fully describe and to exemplify the present invention, the following examples are presented. These examples are not to be construed as in any manner limiting the present invention.

EXAMPLE I

Three samples of inhibitor-free divinylbenzene containing 95 percent by weight divinylbenzene and 5 percent by weight ethylvinylbenzene were placed in three separate sample bottles. To one sample bottle no inhibitor was added, sulfur and TBC was added as the inhibitor to the second sample bottle, and NDPA was added as the polymerization inhibitor to the third sample bottle. All the sample bottles were then purged with nitrogen to remove the dissolved oxygen (air). The sample bottles were then sealed and held at 105°C for 2¼ hours, after which time the samples were analyzed for polymer formation with the following results:

| Sample | Inhibitor | Inhibitor Concentration % by Wt. | Polymer Formation % Wt. |
| --- | --- | --- | --- |
| 1 | None | — | Polymerized violently after 15 minutes |
| 2 | Sulfur and TBC | 0.5% Sulfur + 0.1% TBC | 2.9% |
| 3 | NDPA | 0.2 | 1.2 |

EXAMPLE II

Freshly distilled styrene was placed in the nine separate pressure bottles with the inhibitor below noted and then purged with nitrogen to remove the dissolved oxygen. The sample bottles were then sealed and maintained at 105.5°C for 4¼ hours and then analyzed for polymer content with the following results:

| Sample | Inhibitor | Inhibitor Concentration ppm. Wt. | Polymer Content % Wt. |
| --- | --- | --- | --- |
| 1 | None — blank | 0 | 15.5 |
| 2 | Sulfur | 500 | 2.8 |
| 3 | Sulfur | 1250 | 1.1 |
| 4 | Diphenylamine | 500 | 17.1 |
| 5 | N-nitroso-N-methylaniline | 300 | 1.6 |
| 6 | p-nitroso-N, N-dimethylaniline | 300 | 2.7 |
| 7 | NDPA | 300 | 0.3 |
| 8 | NDPA | 200 | 0.4 |
| 9 | NDPA | 150 | 0.6 |

EXAMPLE III 1,500 grams of freshly distilled styrene were inhibited by adding 300 ppm Wt. NDPA as a 1% Wt. solution in a polyethylbenzene solvent. The polyethylbenzene solvent is the usual by-product stream from an alkylation unit used in the manufacturing of ethylbenzene and is a mixture containing typically approximately 2% Wt. triethylbenzenes, 80% Wt. tetraethylbenzenes, 17% Wt. pentaethylbenzenes and 1% heavier products. The inhibited styrene was then refluxed through a 10 tray Oldershaw column under reduced pressure and a 224°F bottoms temperature for 4¼ hours. At the end of this period the styrene was analyzed and found to contain 0.2% Wt. polymer.

This exact procedure was repeated using 0.125% Wt. sulfur as the inhibitor instead of the polyethylbenzene solution of NDPA. The polymer formation for the sulfur inhibited styrene was 1.1% Wt.

EXAMPLE IV

A 12 inch diameter by 14 feet long distillation column was packed with pro-pac column packing (a commercially available stainless steel packing manufactured by Scientific Development Company). In a first experiment, designated Run No. 1, styrene monomer was inhibited with 0.125% Wt. sulfur and charged to the center of the distillation column at a rate of 80 ml/min. Styrene and polymer was removed as a bottoms product at a rate of 10 ml/min. and pure styrene was taken as an overhead product at a rate of 70 ml/min. The viscosity increase in the bottoms product was used to measure the polymer formation.

This exact procedure was repeated in a second experiment designated Run No. 2, with NDPA being used as the inhibitor instead of sulfur. A sufficient amount of a 5% Wt. solution of NDPA dissolved in a polyethylbenzene solvent was added to the styrene charge to a column to give an inhibitor concentration of 300 ppm wt. The relative polymer formation of the two runs is indicated as follows:

| Continuous dist. run | Inhibitor | Inhibitor conc. p.p.m. wt. | Viscosity of btms. product in centipoises, U.S. time | | | |
| --- | --- | --- | --- | --- | --- | --- |
| | | | 1 hr. | 2 hrs. | 4 hrs. | 5½ hrs. |
| #1 | Sulfur | 1,250 | 44 | 56 | 128 | 568 |
| #2 | NDPA | 300 | 4 | 4 | 4 | 4 |

EXAMPLE V

Crude styrene from an ethylbenzene dehydrogenation unit containing 3.1% Wt. benzene, 6.3% Wt. Toluene, 36.3% Wt. ethylbenzene and 54.3% Wt. styrene was inhibited with 0.125% Wt. sulfur (based on contained styrene) and charged to a three column distillation system. The first column containing 70 distillation stages was used to remove the ethylbenzene, benzene and toluene from the styrene. The crude styrene was charged to the center of the column which was operated at 215°F reboiler temperature and 30 mm Hg absolute overhead pressure. The overhead product typically contained 4.0% Wt. benzene, 11.9% Wt. toluene, 81.5% Wt. ethylbenzene and 2.6% Wt. styrene. The bottoms product from the first column was fed to the center of the second column which contained 25 distillation stages. The second column was used to separate the styrene from the polymer and was operated at 181°F reboiler temperature and 30 mm Hg absolute overhead pressure. The purity of the overhead product was typically 99.5 – 99.8% Wt. styrene. The bottoms product from the second distillation column was charged to the bottom of the third column which is the same size as the second column, and was operated at 30 mm of Hg overhead pressure and a reboiler temperature of 184°F. As much styrene as possible was removed from the polymer. The bottoms product from this third column has no value and is a high pollution waste material. The total losses of styrene to polymer was 1.5% Wt. through the entire three column system.

The same procedure as above was followed except the crude styrene was inhibited with 300 ppm NDPA (based on contained styrene) added as a 5 percent solution in polyethylbenzenes. The total losses of styrene due to polymer formation through the entire three column system was reduced to 0.8 percent which is 47 percent reduction. The amount of material that had to be charged to the third column was reduced by one-half and the residue from the third column was sulfur free and can now be reprocessed or used as fuel.

What is claimed is:

1. A process for the distillation of a readily polymerizable aromatic hydrocarbon compound having ethylenically unsaturated substituents, which comprises subjecting such compound to distillation conditions in the presence of N-nitroso diphenyl amine as a polymerization inhibitor in the absence of oxygen and sulfur.

2. The method as defined in claim 1 wherein the readily polymerizable aromatic hydrocarbon compound is styrene.

3. The method as defined in claim 1 wherein the readily polymerizable aromatic hydrocarbon compound is divinylbenzene.

4. The method as defined in claim 1 wherein the N-nitroso diphenyl amine is first dissolved in a heavy hydrocarbon fraction having a higher boiling point than the ethylenically unsaturated compound being distilled and said heavy hydrocarbon fraction containing the dissolved N-nitroso diphenyl amine is then introduced into said aromatic hydrocarbon compound in the feed stream of said distillation process.

5. The method as defined in claim 4 wherein the N-nitroso diphenyl amine is dissolved in a heavy hydrocarbon fraction having a boiling point at least about 20°F higher than the boiling point of the ethylenically unsaturated compound being distilled.

6. The method as defined in claim 5 wherein the heavy hydrocarbon fraction having a boiling point at least about 20°F higher than the boiling point of the ethylenically unsaturated compound being distilled is one containing aromatic hydrocarbons having greater than two substitutents to the aromatic nucleus.

7. The process as defined in claim 1, wherein said N-nitroso diphenyl amine is present in an amount of from about 50 ppm to 2,000 ppm.

* * * * *